United States Patent [19]

Suzuki

[11] Patent Number: 4,853,494
[45] Date of Patent: Aug. 1, 1989

[54] INFORMATION PROCESSING APPARATUS FOR INPUTTING COORDINATE DATA SELECTIVELY FROM EITHER THE OBVERSE OR THE REVERSE SURFACE OF AN INPUT TABLET

[75] Inventor: Noriyuki Suzuki, Tokyo, Japan

[73] Assignee: Canon Kabushiki Kaisha, Tokyo, Japan

[21] Appl. No.: 168,995

[22] Filed: Mar. 16, 1988

[30] Foreign Application Priority Data

Mar. 20, 1987 [JP] Japan .................................. 62-63681

[51] Int. Cl.$^4$ ............................................. G08C 21/00
[52] U.S. Cl. ..................................... 178/18; 340/706; 340/712; 341/5; 341/23
[58] Field of Search ............................ 178/18, 19, 20; 340/706, 713, 712, 365 VL; 364/491, 512, 518, 520, 522

[56] References Cited

U.S. PATENT DOCUMENTS

| | | | |
|---|---|---|---|
| 3,857,022 | 12/1974 | Rebane et al. | 235/151 |
| 4,330,776 | 5/1982 | Dennison et al. | 340/365 VL X |
| 4,488,000 | 12/1984 | Glenn | 178/18 |
| 4,564,928 | 1/1986 | Glenn et al. | 367/907 X |
| 4,665,282 | 5/1987 | Sato et al. | 178/18 |
| 4,745,565 | 5/1988 | Garwin et al. | 364/571 |

FOREIGN PATENT DOCUMENTS

| | | |
|---|---|---|
| 0169538 | 1/1986 | European Pat. Off. . |
| 3027923 | 3/1982 | Fed. Rep. of Germany . |
| 58-33783 | 2/1983 | Japan . |
| 60-93544 | 5/1985 | Japan . |
| 63-4320 | 1/1988 | Japan . |
| 2042726 | 9/1980 | United Kingdom . |

*Primary Examiner*—Stafford D. Schreyer
*Attorney, Agent, or Firm*—Fitzpatrick, Cella, Harper & Scinto

[57] ABSTRACT

An information processing apparatus includes a vibration pen for generating a vibration, a transmission propagation member with which the vibration pen is brought into contact so as to propagate the vibration generated by the vibration pen, sensors for detecting the vibration propagating in the vibration propagation member, a CPU for calculating a contact position of the vibration pen from detection times of the vibration detected by the sensors, a mercury switch for detecting an obverse or reverse surface of the vibration propagation member, and a memory for storing coordinate values calculated by the CPU in different memory areas according to a detection result of the mercury switch. Coordinate data may be input selectively from either the obverse or the reverse side of the vibration propagation member, which thereby functions as a reversible input tablet.

8 Claims, 14 Drawing Sheets

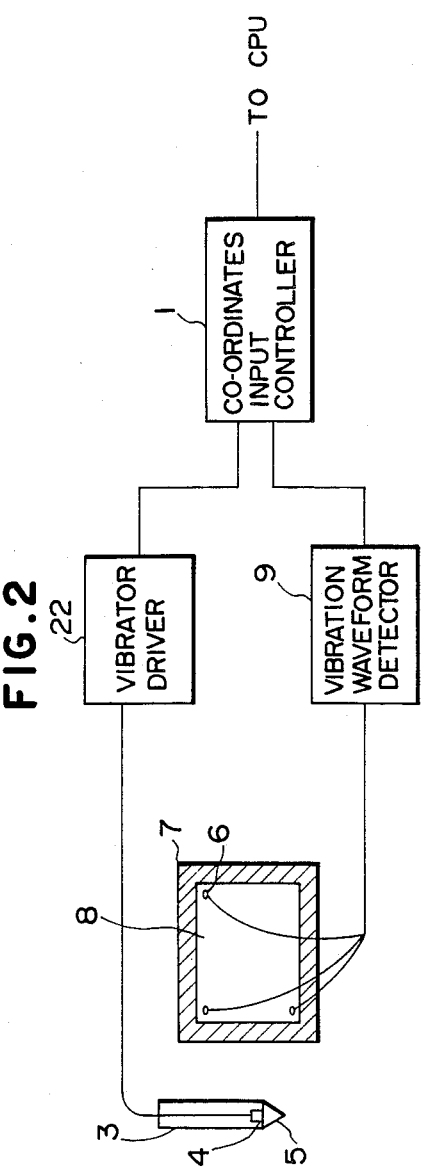
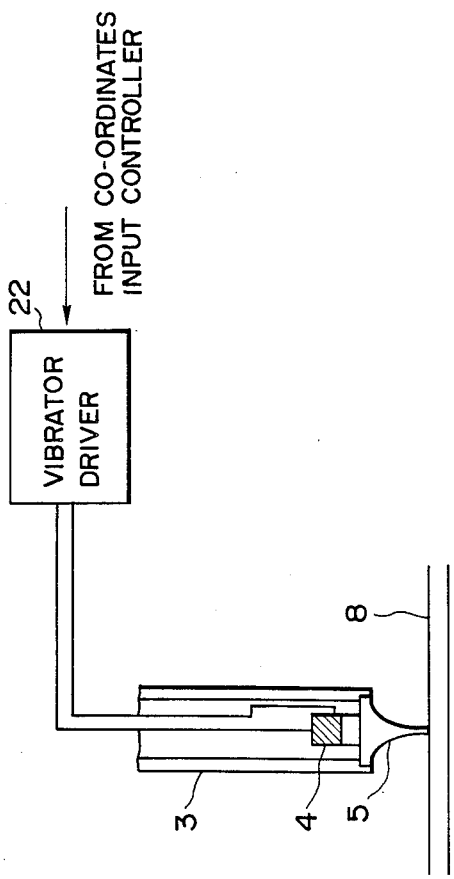
FIG. 2
FIG. 3

DISPLAY SCREEN

INFORMATION PROCESSING APPARATUS FOR INPUTTING COORDINATE DATA SELECTIVELY FROM EITHER THE OBVERSE OR THE REVERSE SURFACE OF AN INPUT TABLET

BACKGROUND OF THE INVENTION

1. Field of the Invention

The present invention relates to an information processing apparatus and, more particularly, to an information processing apparatus including a coordinates input means capable of inputting coordinates from obverse and reverse surfaces of the apparatus and a means for outputting information input from the coordinates input means.

2. Related Background Art

Conventional coordinates input apparatus using various types of input pens and tablets are known as apparatuses for inputting handwritten character and graphic information in a processor such as a computer. Image information such as input character and graphic information in the apparatus of this system is output to a display unit such as a CRT display or a recording apparatus such as a printer.

An X-Y coordinate system is set in a tablet of the apparatus of this system. Input data is input as the coordinate data. Various schemes are employed to perform coordinate detection:

(1) A scheme in which a change in resistance of a sheet member opposite to a resistance film is detected;

(2) A scheme in which an electromagnetic or electrostatic induction of a conductive sheet or the like which is arranged so as to face a coil (an inductor) is detected; and (3) A scheme in which an ultrasonic vibration transmitted from an input pen to a tablet is detected.

An input tablet according to each scheme described above has a flat member. One conventional tablet unit has symmetrical structures on the obverse and reverse surfaces of the tablet to allow coordinate inputs on either surface.

A CAD system and a drafting system are exemplified as information processing apparatuses using the above information input/output system. In a conventional system of this type, operations on the display screen are replaced with those on drawing paper. Therefore, this system aims at simplifying editing operations such as copying, deletion, and replacement of complicated image elements.

In the above system, operations performed on the input tablet are similar to conventional operations using paper and pencils, as compared with operations using a mouse or joystick. Therefore, the user can easily perform the operations with the input tablet.

Conventional drafting with paper and pens/pencils is often performed such that the obverse and reverse sides of an object to be drawn are discriminated. Such drafting is exemplified as drafting of mechanical drawings or a graph which is drawn on tracing paper or an OHP film.

In mechanical and design drawings, hatched lines representing a sectional view and rules for filling characters and symbols are drawn on the reverse surface of paper, while shapes and dimensions are written on the obverse surface of paper. In drafting of graphs and tables, rules and a coordinate system are written on the reverse paper surface, while elements in the graph and table are written on the obverse paper surface. According to these operations, information written on the reverse paper surface is the one which need not be changed once it is written. Even if deletion, changes, and corrections are frequently repeated on the obverse paper surface, the information on the reverse paper surface is not adversely affected.

In design operations using the drawings, the coordinate system on the obverse paper surface must often be reversed when the paper is turned over because design modifications or drafting from the opposite direction of given member is required.

Even if an image is input using the input tablet described above, a strong demand has arisen for developing a processing system wherein information input on the obverse paper surface can be discriminated from that on the reverse paper surface or a coordinate system of an image input on one input surface can be reversed in accordance with use of the tablet surface in the input mode.

Even if a conventional reversible input type tablet is used, the obverse and reverse surfaces are selectively used for simply inputting information, but they cannot be discriminated from each other. Therefore, image processing based on input surfaces cannot be performed.

The above problem is not only limited to an image processing system but also is also encountered in processing of characters, symbols or coordinate information itself.

SUMMARY OF THE INVENTION

It is an object of the present invention to provide an information processing apparatus for bringing a vibration pen into contact with a vibration propagation member to obtain coordinates from vibration detection time, wherein coordinate values can be stored in different memory areas in accordance with obverse and reverse surfaces of the vibration propagation member.

It is another object of the present invention to provide an information processing apparatus wherein coordinate data can be stored in a corresponding memory area in accordance with an obverse/reverse surface of a coordinate input tablet.

It is still another object of the present invention to provide an information processing apparatus capable of performing different display representations by discriminating a point designated on each surface.

BRIEF DESCRIPTION OF THE DRAWINGS

FIG. 2 is a block diagram of a coordinates input apparatus shown in FIG. 1;

FIG. 3 is a schematic view for explaining a structure of an input pen shown in FIGS. 1 and 2;

DETAILED DESCRIPTION OF THE PREFERRED EMBODIMENTS

The present invention will be described in detail with reference to preferred embodiments in conjunction with the accompanying drawings.

Overall Arrangement

Figure 1:
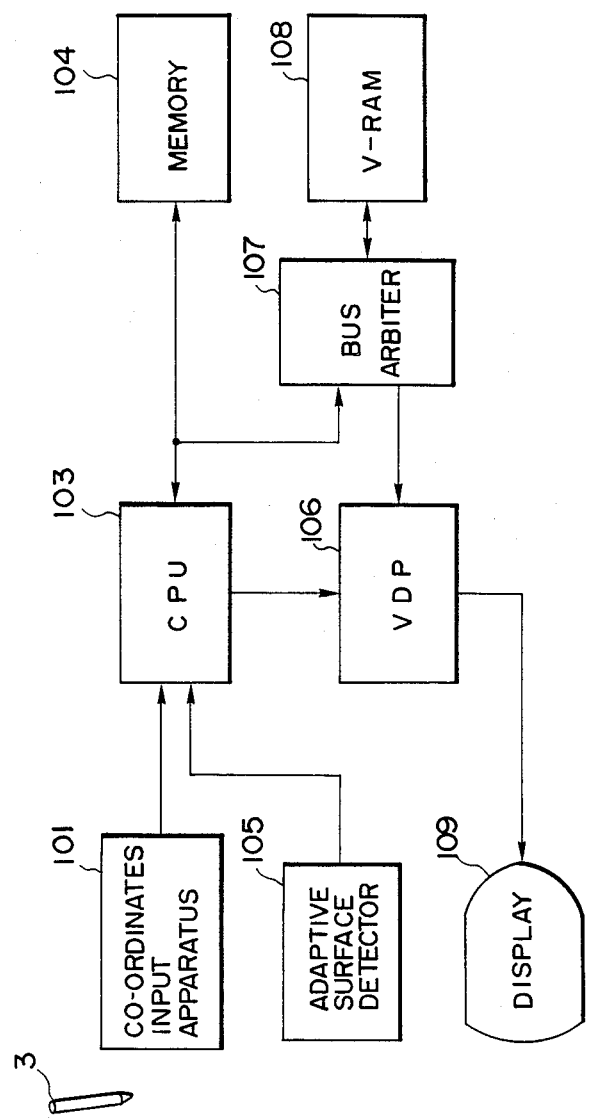
FIG. 1 is a block diagram showing an arrangement of an image processing system which employs the present invention.

FIG. 1 shows a schematic arrangement of an image information processing system which employs the present invention. A coordinates input apparatus 101 inputs image information such as handwritten character and graphic images and performs a coordinate input with an input pen 3. The detailed arrangement of the coordinates input apparatus will be described later.

A display 109 serves as an output device for input image information. A memory device for the input image information is constituted by an image information memory device (V-RAM) 108 comprising a RAM element.

In this embodiment, the display 109 is arranged below a transparent input board of the coordinates input apparatus 101, so that an input can be visually checked through the input board. Bit map display can be performed on the display 109, so that information input from the coordinates input apparatus 101 can be directly displayed on the display 109. For example, an image written on the coordinates input apparatus 101 with the vibration pen 3 can be directly displayed on the display 109.

Overall image input/output control can be performed by an information processing unit (CPU) 103. An output from the display 109 is controlled by the CPU 103 through a display control unit (VDP) 106. An information input to the V-RAM 108 and an output of the stored image information to display 109 are performed through a bus arbiter 107.

The coordinates input apparatus 101 comprises a flat tablet which can be used for inputting coordinates on its both obverse and reverse surfaces. In this embodiment, processing conditions can be changed in accordance with the obverse/reverse input surface in the coordinate input mode. For this purpose, a using surface detector 105 is arranged to detect a using (adaptive) surface during the input operation of the coordinates input apparatus 101.

Referring to FIG. 1, the image information processing system also includes a memory 104 comprising a RAM or ROM for temporarily storing image information, character data, and control programs (to be described later).

Arrangement of Coordinates Input Section

FIG. 2 shows an arrangement of an input section in the coordinates input apparatus 101.

A vibration transmission plate 8 comprises a acrylic or glass plate and transmits a vibration from the vibration pen 3 to three vibration sensors 6 arranged at corners of the plate. In this embodiment, a propagation time of an ultrasonic vibration transmitted from the vibration pen 3 to the vibration sensors 6 through the vibration transmission plate 8 is measured to detect coordinates of the vibration pen 3 on the vibration transmission plate 8.

The peripheral portion of the vibration transmission plate 8 is supported by a reflection preventive member 7 consisting of silicone rubber so as to prevent the vibration from being reflected by the peripheral portion and directed toward the central portion.

The vibration pen 3 for transmitting the ultrasonic vibration to the vibration transmission plate 8 includes a vibrator 4 comprising a piezoelectric element. The ultrasonic vibration generated by the vibrator 4 is transmitted to the vibration transmission plate 8 through a horn 5 having a tapered tip.

FIG. 3 shows a structure of the vibration pen 3. The vibrator 4 incorporated in the vibration pen 3 is driven by a vibrator driver 22. A drive signal from the vibrator 4 is supplied as a pulse signal of low level from a coordinates input controller 1 (FIG. 2). The pulse signal of low level is amplified with a predetermined gain by the vibrator driver 22 which can perform low-impedance driving. The amplified signal is supplied to the vibrator 4.

The electrical drive signal is converted into a mechanical ultrasonic vibration by the vibrator 4. The mechanical ultrasonic vibration is transmitted to the vibration plate 8 through the horn 5.

A vibration frequency of the vibrator 4 can be set to be a value which allows vibrations of the vibration transmission plate 8 consisting of an acrylic resin or glass. When the vibrator is driven, a vibration mode is selected such that the vibrator 4 is vibrated in the vertical direction (FIG. 3) with respect to the vibration transmission plate 8. The vibration frequency of the vibrator 4 is set to be the resonant frequency of the vibrator 4, thereby performing effective vibration conversion.

A wave to be transmitted to the vibration transmission plate 8 is an elastic wave and tends not to be adversely affected by scratches and obstacles on the surface of the vibration transmission plate 8, as compared with a surface wave. In this embodiment, coordinates are input on both the obverse and reverse surfaces of the vibration transmission plate 8. In this case, the elastic waves allow uniform vibration transmission characteristics regardless of the obverse or reverse surface of the plate 8.

Referring back to FIG. 2, the vibration sensors arranged at the corners of the vibration transmission plate 8 comprise mechanical-electrical conversion elements such as piezoelectric elements. Output signals from the three vibration sensors 6 are input to a vibration waveform detector 9 and are converted into signals. The converted signals are suitable for processing in the subsequent coordinates input controller 1. The coordinates input controller 1 measures the vibration propagation time and detects coordinates of the vibration pen 3 on the vibration transmission plate 8.

Figure 4:
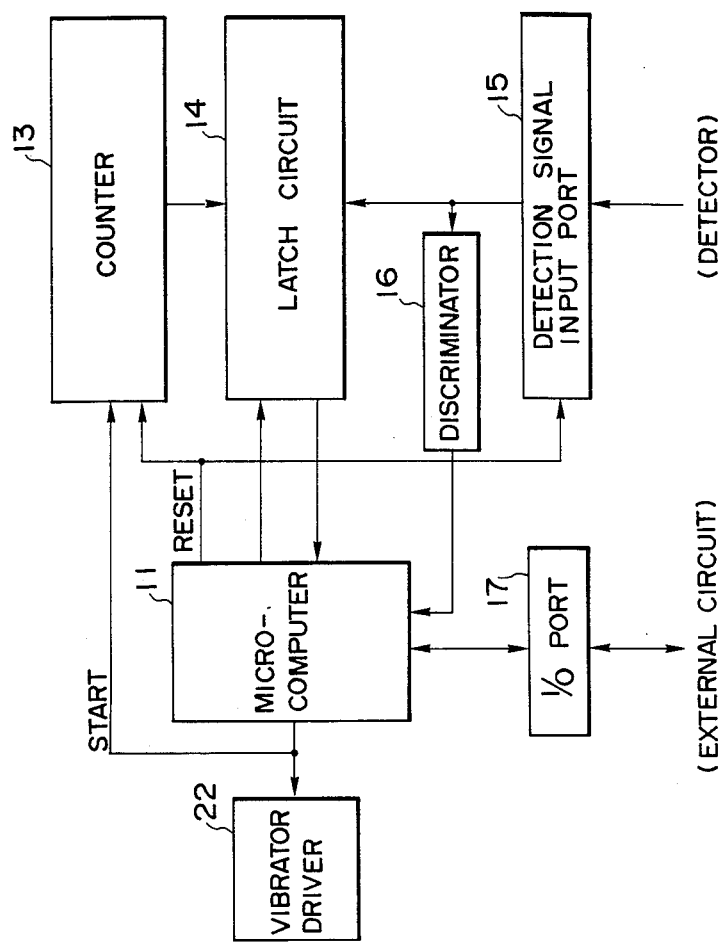
FIG. 4 is a block diagram of a coordinates input controller shown in FIG. 2.

FIG. 4 shows an arrangement of the coordinates input controller 1. The arrangement mainly includes a drive system for the vibration pen 3 and a vibration detection system by the vibration sensors 6.

A microcomputer 11 comprises an internal counter, a ROM, and a RAM. The microcomputer 11 supplies drive pulses having a predetermined frequency to the vibrator driver 22 as shown in FIG. 2 and is started in synchronism with a coordinate operation circuit under the control of the microcomputer 11.

A count of a counter 13 is latched by a latch circuit 14 under the control of the microcomputer 11.

The vibration waveform detector 9 receives outputs from the vibration sensors 6 and outputs timing information of a detection signal for measuring the vibration propagation time for coordinate detection and signal level information for pen pressure detection. The timing information and the level information are input to input port 15 and discriminator 16, respectively.

A timing signal input from the vibration waveform detector 9 is input to the input port 15 and is compared by the discriminator 16 with a count in the latch circuit 14. A comparison result is supplied to the microcomputer 11. A latched value of the output signal from the counter 13 is expressed a the vibration propagation time. Coordinates are then calculated on the basis of the vibration propagation time.

Information output control processing for an external circuit, e.g., the CPU 103 in FIG. 1 is performed through an I/O port 17.

General processing for detecting input coordinate information will be described below. For illustrative convenience, it is assumed that coordinates are input on only one input surface although they can be input on either surface in practice.

Figure 5:
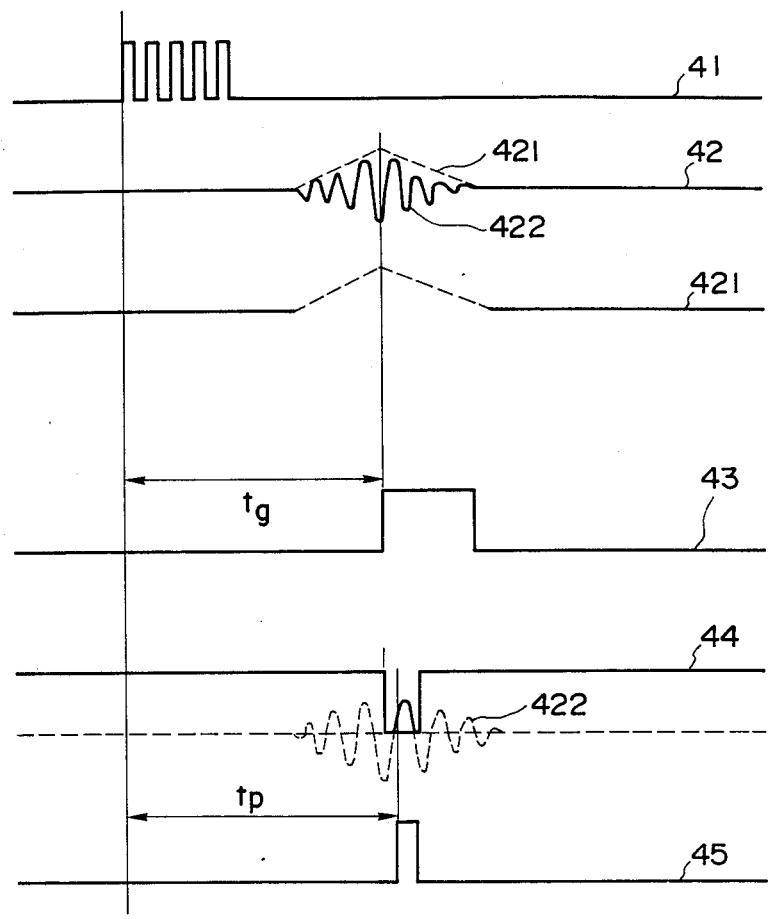
FIG. 5 is a timing chart for explaining an input coordinate decision method according to the present invention.

FIG. 5 is a timing chart for explaining a detection waveform input to the vibration waveform detector 9 (FIG. 2) and measurement of the vibration propagation time on the basis of the detected waveform. Referring to FIG. 5, a drive signal pulse 41 is supplied to the vibration pen 3. An ultrasonic vibration is transmitted from the vibration pen 3 vibrated by such a waveform to the vibration transmission plate 8 and is detected by the vibration sensors 6.

The vibration propagates through the vibration transmission plate 8 by a time tg corresponding to a distance to the given vibration sensor 6 and reaches the given vibration sensor 6. This vibration sensor 6 detects a signal waveform 42 in FIG. 5. The plate wave in this embodiment is a dispersive wave, and a relationship between an envelope 421 of the detected waveform and a phase 422 with respect to the propagation distance in the vibration transmission plate 8 is changed in accordance with the transmission or propagation distance during vibration transmission.

A propagation speed of the envelope is given as a group speed Vg, and a phase speed is given as Vp. A distance between the vibration pen 3 and the given vibration sensor 6 can be detected according to a difference between the group and phase speeds.

Only the envelope 421 is taken into consideration. The speed of the envelope 421 is given as Vg. If a point on a specific waveform, i.e., a peak is detected as indicated by reference numeral 43 in FIG. 5, a distance d between the vibration pen 3 and the given vibration sensor 6 is given as $$d = Vg \cdot tg \qquad (1)$$

where tg is the vibration propagation time. The above equation is established for the given vibration sensor 6. Distances between the vibration pen 3 and the remaining vibration sensors 6 can be similarly obtained.

In order to determine coordinate values with high precision, processing based on phase signal detection is performed. When a time interval between the start of vibration application and a specific detection point of the phase waveform 422 in FIG. 5, e.g., a zero-crossing point after the peak is given as tp, the distance between the vibration sensor and the vibration pen is given as follows:

$$d = n \cdot \lambda p + Vp \cdot tp \qquad (2)$$

where $\lambda p$ is the wavelength of the elastic wave, and n is an integer.

The integer n is defined by equations (1) and (2) as follows:

$$n = [(Vg \cdot tg - Vp \cdot tp)/\lambda p + 1/N] \qquad (3)$$

where N is a real number excluding zero. The real number N can be selected to be an appropriate value. For example, if N=2, n can be determined within the $\pm\frac{1}{2}$ wavelength.

A substitution of n calculated as described above into equation (2) yields an accurate distance between the vibration pen 3 and the given vibration sensor 6.

Measurements of the vibration propagation time tg and the time interval tp, as shown in FIG. 5, are performed by the vibration waveform detector 9 in FIG. 2. The vibration waveform detector 9 is arranged as shown in FIG. 6.

Figure 6:
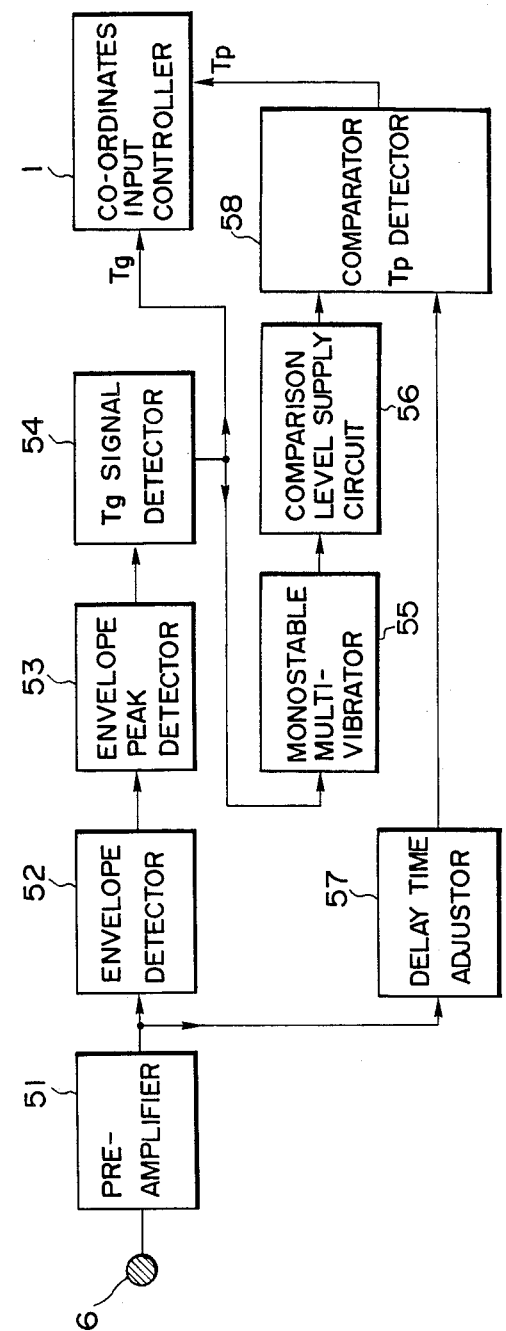
FIG. 6 is a block diagram of a coordinate detection system.

Referring to FIG. 6, output signals from the vibration sensors 6 are amplified by a pre-amplifier 51 to a predetermined level. The amplified signal is input to an envelope detector 52. The envelope detector 52 extracts only an envelope of the detection signal.

A timing of a peak of the extracted envelop is detected by an envelope peak detector 53. A peak detection signal is processed by a Tg signal detector 54 including a comparator. An envelope delay time detection signal Tg from the Tg signal detector 54 is input to the coordinates input controller 1.

The signal Tg and an original signal delayed by a delay time adjustor 57 are input to a Tp signal detector 58 including a comparator. The Tp signal detector 58 generates a phase delay time detection signal Tp. The signal Tp is input to the coordinates input controller 1.

The Tp signal detector 58 is adjusted by a monostable multivibrator 55 and a comparison level supply circuit 56 and is enabled only for a predetermined period of time upon detection of the signal Tg. Therefore, the zero-crossing point after the peak can be detected.

The circuit shown in FIG. 6 is arranged for one vibration sensor. Identical circuits are respectively arranged for other vibration sensors 6. If the number of sensors is given as h, h detection signals for the envelope delay times Tg1-Tgh and the phase delay times Tp1-Tph are input to the coordinates input controller 1.

The coordinates input controller in FIG. 4 receives the Tg1-Tgh and Tp1-Tph signals from the input port 15, and the respective timing pulses serve as trigger pulses to cause the latch circuit 14 to latch the count from the counter 13. Since the counter 13 is started in synchronism with driving of the vibration pen, as described above, data representing the envelope and phase delay times can be latched by the latch circuit 14.

Figure 7:
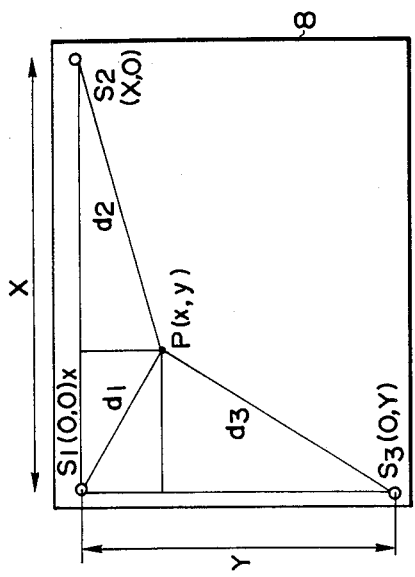
FIG. 7 is a view showing a detection coordinate system.

When the three vibration sensors 6 are respectively arranged at corner positions S1 to S3 of the vibration transmission plate 8, as shown in FIG. 7, shortest distances d1 to d3 from a position P of the vibration pen 3 to the positions of the vibration sensors 6 can be calculated by processing described in association with FIG. 4. The coordinates input controller 1 calculates coordinates (x,y) of the vibration pen 3 in accordance with the theorem of three squares (Pythagorean theorem) using the distance $d_1$ to $d_3$ as follows:

$$x = x/2 + (d1+d2)(d1-d2)/2X \tag{4}$$

$$y = y/2 + (d1+d3)(d1-d3)/2Y \tag{5}$$

where X and Y are distances between the sensor located at the origin (position S1) and the sensors located at positions S2 and S3.

As described above, the coordinates of the vibration pen 3 can be detected in a real time manner.

Reversing of Obverse/Reverse Surface of Coordinates Input Section

Figure 8C:
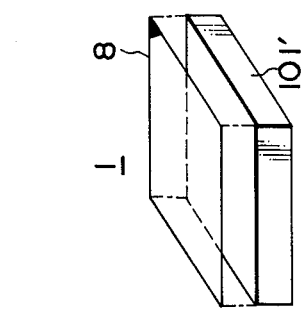
FIGS. 8A to 8C are views showing the reversing process of a vibration transmission plate of the coordinates input apparatus.
Figure 8B:
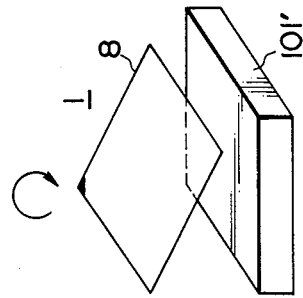
Figure 8A:
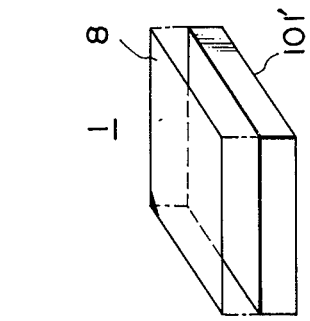

The coordinates input section in the coordinates input apparatus 101 comprises the vibration transmission plate 8 made of a transparent acrylic plate. As shown in FIGS. 8A to 8C, when the vibration transmission plate 8 is turned over, the obverse and reverse surfaces can be used as input surfaces. As shown in FIG. 8A, the vibration transmission plate 8 is removed from a main unit 101' (incorporating the display 109 or other processing sections) in the coordinates input apparatus 101. As shown in FIG. 8B, the vibration transmission plate 8 is turned over. The vibration transmission plate 8 is then attached to the main unit 101', as shown in FIG. 8C.

As indicated by a black triangle in FIG. 8A, 8B, or 8C, when the vibration transmission plate 8 is turned over, the right side of the vibration transmission plate 8 becomes the left side. If the horizontal direction of the vibration transmission plate 8 corresponds to the X-axis of the display coordinate system, the x-coordinates are reversed when the reverse input surface of the vibration transmission plate 8 faces up.

The vibration sensors 6 (not shown in FIGS. 8A to 8C) may be reversed together with the vibration transmission plate or may be fixed on the main unit 101'.

Figure 9C:
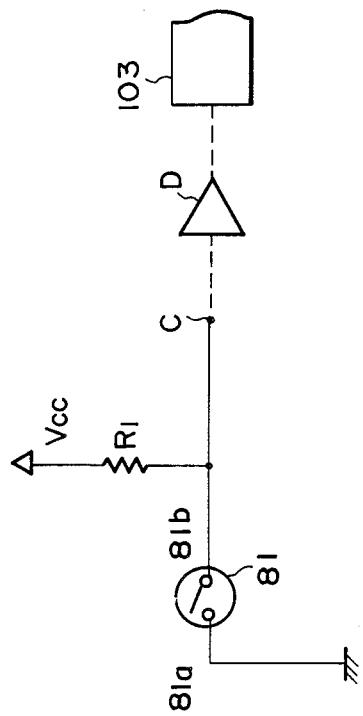
FIG. 9C is a circuit diagram of an obverse/reverse detector for the vibration transmission plate.
Figure 9A:
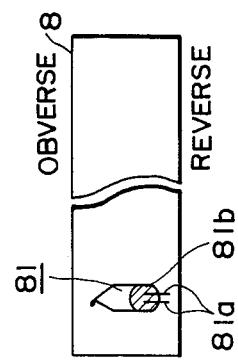
FIGS. 9A and 9B are views showing an obverse/reverse detection apparatus for the vibration transmission plate.
Figure 9B:
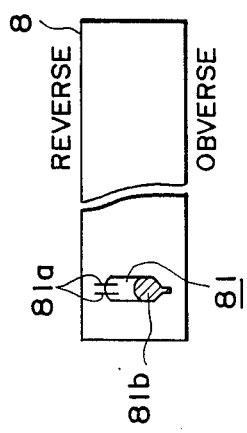

In the above embodiment, in order to control processing of the input image in accordance with the obverse/reverse input surface of the reversible vibration transmission plate 8, a detector (corresponding to 105 in FIG. 1) shown in FIGS. 9A to 9C is arranged.

In this embodiment, the detector 105 comprises a mercury switch 81. The mercury switch 81 comprises a glass tube in which mercury and electrodes are sealed. In this embodiment, the mercury switch 81 is arranged on the vibration transmission plate 8 or its support portion as shown in FIG. 9A and 9B such that a detection direction is matched with a direction perpendicular to the surface of the plate 8. The electrodes 81a arranged at one end of the tube of the mercury switch 81 are located on the obverse or reverse side of the vibration transmission plate 8.

With this structure, when the obverse side of the vibration transmission plate 8 faces up, as shown in FIG. 9A, the mercury 81b in the switch 81 is moved downward by the gravity to conduct the electrodes 81a. However, when the reverse surface of the vibration transmission plate 8 faces up, as shown in FIG. 9B, the electrodes 81a are opened. When the ON state of the electrodes 81a is detected, the mounting state of the vibration transmission plate 8 can be detected. In other words, the input surface of the vibration transmission plate 8 can be specified.

The detection circuit of the mercury switch 81 is shown in FIG. 9C. One of the electrodes 81a of the mercury switch 81 is grounded, and the other electrode is pulled up to a power source voltage Vcc through a resistor R1 and is connected to a detection terminal c. With this arrangement, when a change in voltage at the detection terminal c is detected by a detector D such as a Schmitt trigger circuit, a digital signal representing the obverse/reverse surface of the vibration transmission plate 8 is generated. This digital detection signal is input to the CPU 103 and used for subsequent image processing.

The obverse/reverse surface detection switch in the vibration transmission plate 8 is not limited to the mercury switch but may be replaced with any other switch. For example, limit switches can be arranged on both surfaces of the vibration transmission plate 8, and the limit switch which is brought into contact with the main unit 101' can be turned on.

Arrangement of Image Storage and Output Section

Figure 10:
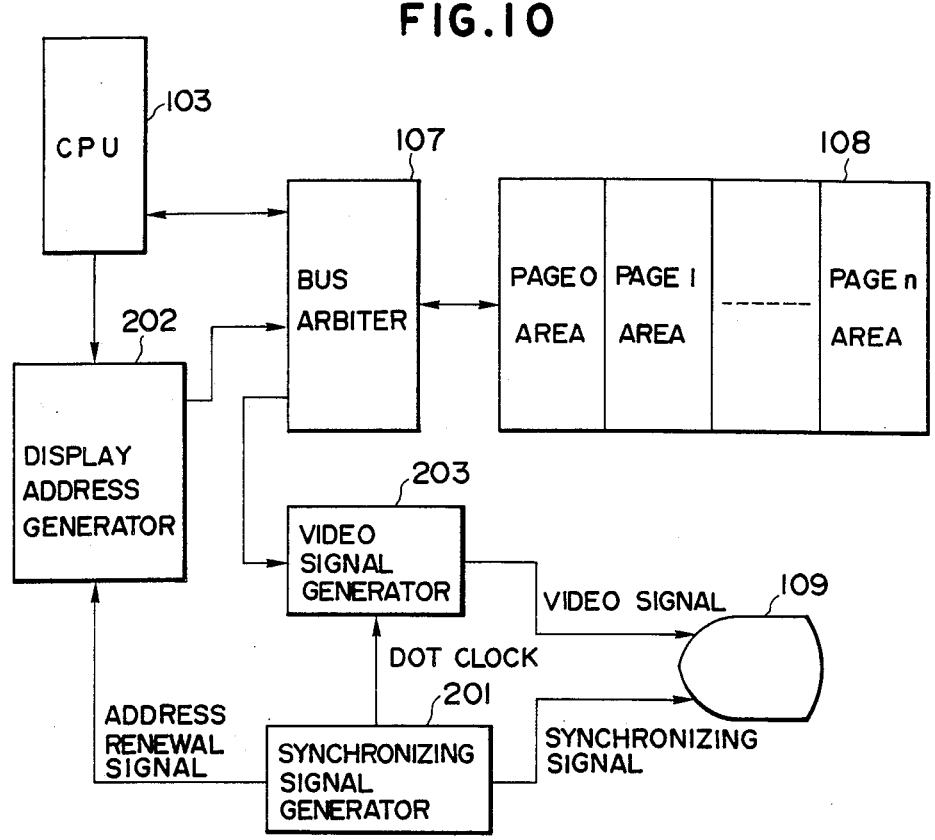
FIG. 10 is a block diagram showing an arrangement of a V-RAM and a peripheral circuit of a display output section.

FIG. 10 shows a detailed arrangement of an image storage and display output system in FIG. 1. As shown in FIG. 10, the V-RAM 108 has a page format using an 8-bit address. The V-RAM 108 has a memory area of (n+1) pages from page 0 to page n. One page corresponds to an image area of one page in the input or display coordinate system.

In this embodiment, one frame of the display 109 or a resolution of the coordinates input apparatus is given as 512×512 dots. For example, a memory capacity for storing six frames (pages) is:

$$512 \times 512 \times 6 = 192 \times 1024 = 192 \text{ Kbytes} \tag{6}$$

The display 109 is controlled by a video signal output from the video signal generator 203 and a synchronizing signal output from the synchronizing signal generator 201.

The synchronizing signal generator 201 comprises an oscillator counter. The synchronizing signal generator 201 generates an address renewal signal and a dot clock signal in addition to the synchronizing signal. These signals are input to the display address generator 202 and the video signal generator 203.

The display address generator 202 outputs an address signal to the V-RAM 108 to read out display dot data in synchronism with the address renewal signal. One of the (n+1) pages from which image data is read out is determined by the CPU 103.

The video signal generator 203 converts the readout 8-bit parallel data in synchronism with dot clocks into serial data, thereby generating the video signal.

Overall Operation

The overall operation will be described below.

Figure 11:
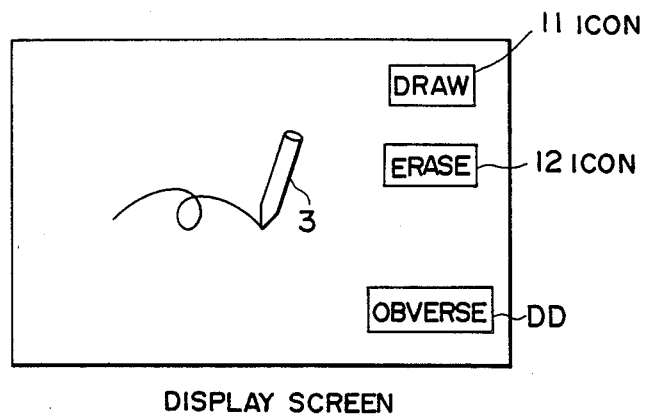
FIG. 11 is a view for explaining image input processing.

FIG. 11 is a view of the coordinate input section and the display section when viewed from the top.

An icon (index) is displayed on a display arranged below the coordinate input section, and the icon is operated with the vibration pen 3 to input information.

Two icons I1 and I2, i.e., "DRAW" and "ERASE" are displayed in the right end area of the screen as shown in FIG. 11. When the tip of the vibration pen 3 is brought into contact with a desired icon position, the function indicated by the selected icon is effected. The operation corresponding to the selected icon can be discriminated in coordinates detection processing described above.

When the operator draws a figure on the vibration transmission plate 8 with the vibration pen 3, coordinates of input points are detected in a real time manner, and information is displayed on the display 109. The "DRAW" operation is performed on the display 109. In the "ERASE" mode, the figure drawn with the vibration pen 3 is erased after the "ERASE" icon I2 is operated until the "DRAW" icon I1 is operated again.

Operation systems (modes) excluding the "DRAW" and "ERASE" modes may be proposed.

In this embodiment, as shown in FIGS. 8A to 8C, the vibration transmission plate 8 can be reversed and used. The obverse and reverse surfaces of the vibration transmission plate 8 can be detected by the mercury switch 81. The CPU 103 causes the display 109 to display information DD (FIG. 11) representing the detected obverse/reverse surface of the vibration transmission plate 8.

Information input from the obverse/reverse surface of the vibration transmission plate 8 is stored in the V-RAM 108 in a clearly discriminated form. An image input from the obverse or reverse surface of the vibration transmission plate 8 is stored in units of pages of the V-RAM 108. Since images input from the obverse and reverse surfaces of the vibration transmission plate 8 are combined, data obtained by reversing the coordinate axes of an image input from one surface (reversed with respect to the X-axis when the plate is reversed in the manner shown in FIGS. 8A to 8C). The reverse data is stored in another page.

Figure 12:
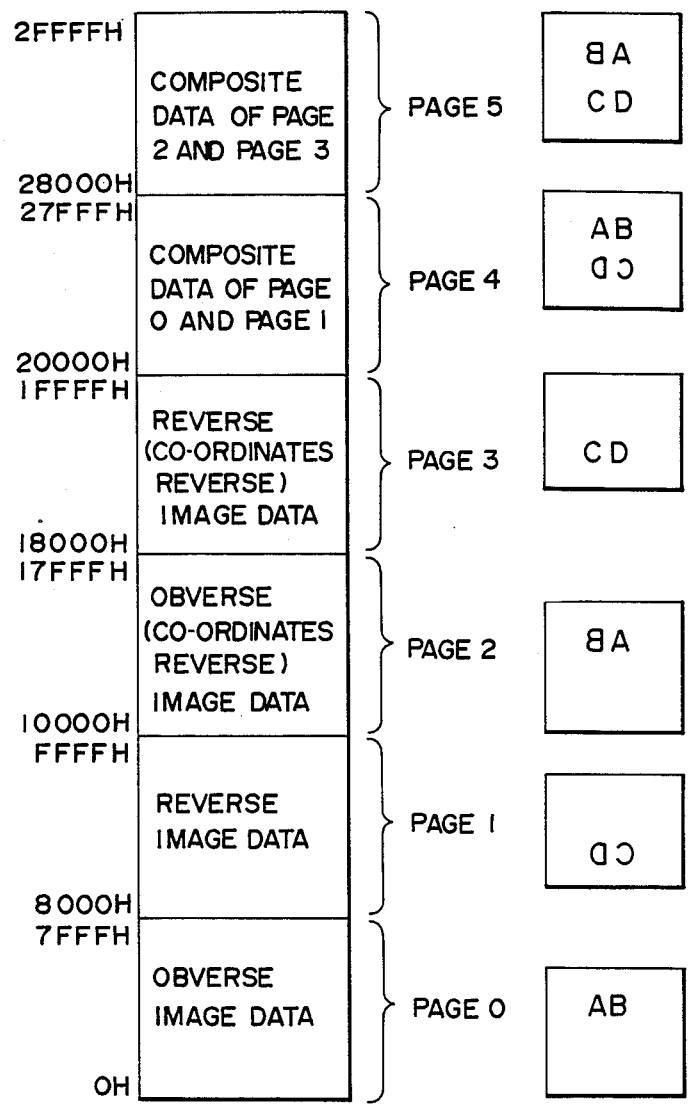
FIG. 12 is a view for explaining memory allocation of the V-RAM.

For example, as shown in FIG. 12, when an image is input from the obverse surface of the vibration transmission plate 8, image information is written at page 0. Image information obtained by reversing the coordinate values with respect to the X-axis is written at page 2. Composite data of page 0 and page 1 is written at page 4.

When the reverse surface of the vibration transmission plate 8 is used for inputting information, image information (the resultant coordinate values are reversed beforehand) is written at page 1. Image information obtained by reversing the coordinate values with respect to the X-axis is written at page 3. Composite data of page 2 and page 3 is written at page 5. Images stored on the respective pages are indicated on the right side of FIG. 12. Letters "AB" are input from the obverse input surface, and letters "CD" are input from the reverse input surface.

When the obverse surface of the vibration transmission plate 8 is used, page 4 is displayed. To the contrary, when the reverse surface of the vibration transmission plate 8 is used, page 5 is displayed. Therefore, the operator can perform image editing on the obverse and reverse surfaces as if he uses tracing paper.

In this case, during editing using only one surface, if images input from this surface are controlled to be changed and erased, image editing can be performed as in editing with tracing paper. The discrimination between the obverse and reverse surfaces can be applied to all correction and editing operations such as image enlargement, reduction, shifting, rotation, reversing, and copying.

An image on the reverse surface can be erased during editing. In this case, only pages 0, 1, 2 and 3 are displayed.

As shown in FIG. 12, 32-kbyte data of $0_{(H)}$ (where H represents the hexadecimal notation) to $7FFF_H$ are used for one-page data (i.e., $512 \times 512$ bits).

Figure 13:
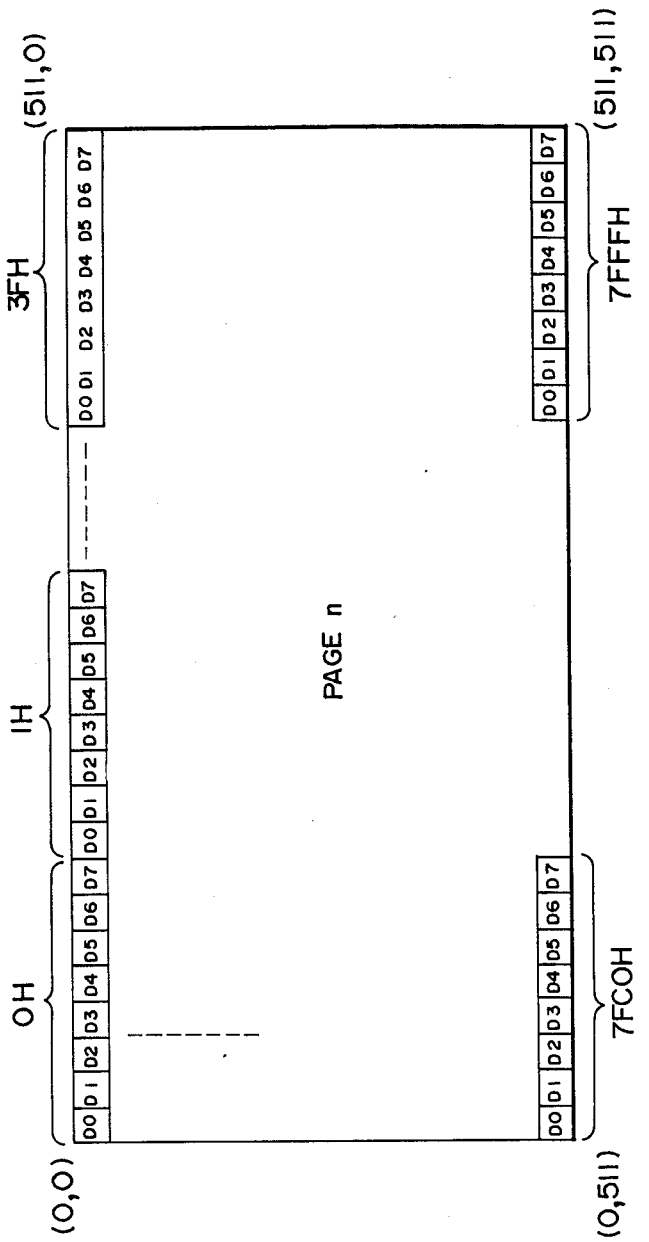
FIGS. 13 and 14 are views showing memory allocation of a one-frame image when x- and y-axes are reversed.
Figure 14:
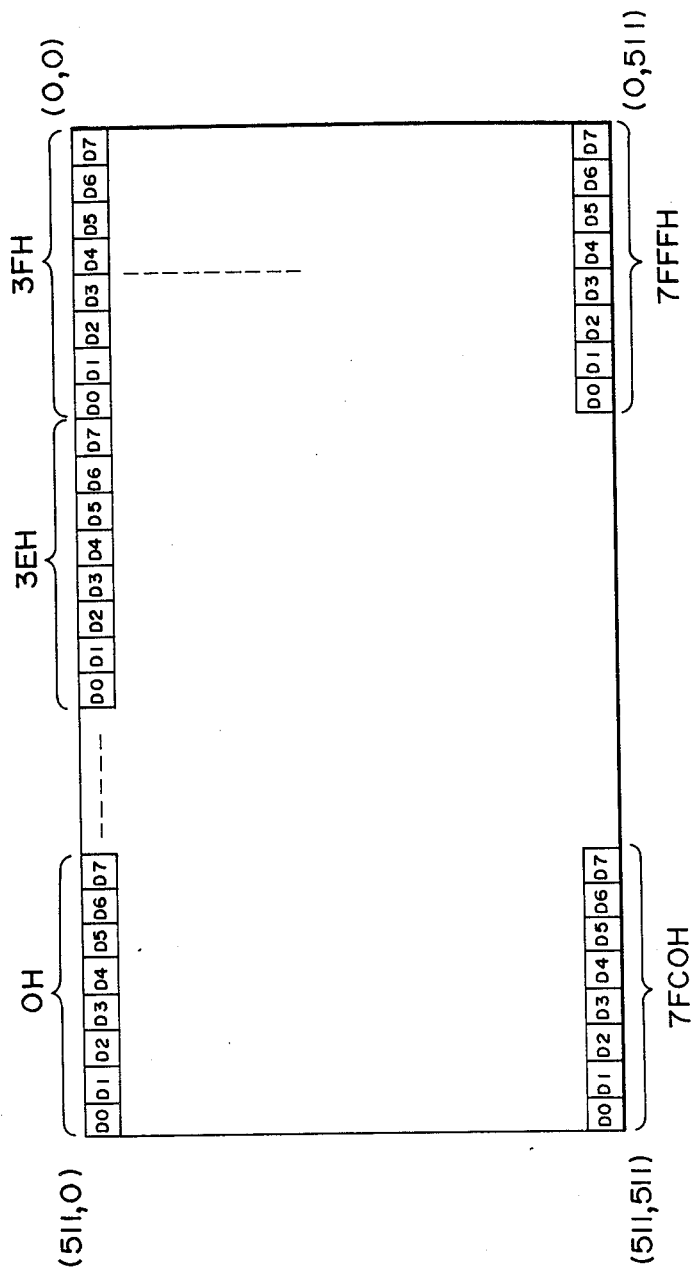

FIGS. 13 and 14 show ($512 \times 512$)-bit image data and memory allocation schemes of one-page of the V-RAM 108.

The upper left corner of the screen in FIG. 13 is the origin (0,0). These dot data are stored at 8-bit addresses illustrated in FIG. 13. In this memory allocation, a memory address add and a bit b of a given input coordinates (x,y) are given as follows:

$$add = (512 \cdot y + x) \backslash 8$$

$$b = (512 \cdot y + x) \mathrm{MOD} 8$$

wherein "$\alpha \backslash \beta$" represents a division of integers (a remainder is rounded off), and "$\alpha \mathrm{MOD} \beta$" represents a calculation for obtaining a remainder of $\alpha/\beta$. The function "$\backslash$" is generally indicated by the symbol "$\backslash$" (backslash) in a procedure-level computer language such as BASIC.

FIG. 14 shows a case wherein the right side of the display screen is reversed as the left side, i.e., X-axis reversing is performed. Therefore, address add and a bit b of a memory for input coordinates (x,y) are given as follows.

$$add = 64((512 \cdot y + x) \backslash 512) + 63 - ((512 \cdot y + x\backslash) \mathrm{MOD} 512) \backslash 8$$

$$b = 7 - ((512 \cdot y + x) \mathrm{MOD} 512) \mathrm{MOD} 8$$

When the CPU 103 reverses the X-axis of the image, the above operations are performed to reverse the image. It should be noted that real address calculations in page allocation in FIG. 12 require an offset in units of $8,000_H$ in each page.

According to this embodiment as described above, image erasure on a surface opposite to the image input surface can be inhibited, or images input from both the obverse and reverse surfaces can be combined with matched directions of the images in accordance with the input surface of the vibration transmission plate. The operator can perform editing in a way very similar to conventional editing with paper and a pen/pencil. Therefore, an information processing system having excellent operability and requiring only a short training period can be provided.

Another Embodiment

In the above embodiment, the image is reversed by a software means. However, the image can be reversed by a hardware means.

Figure 15:
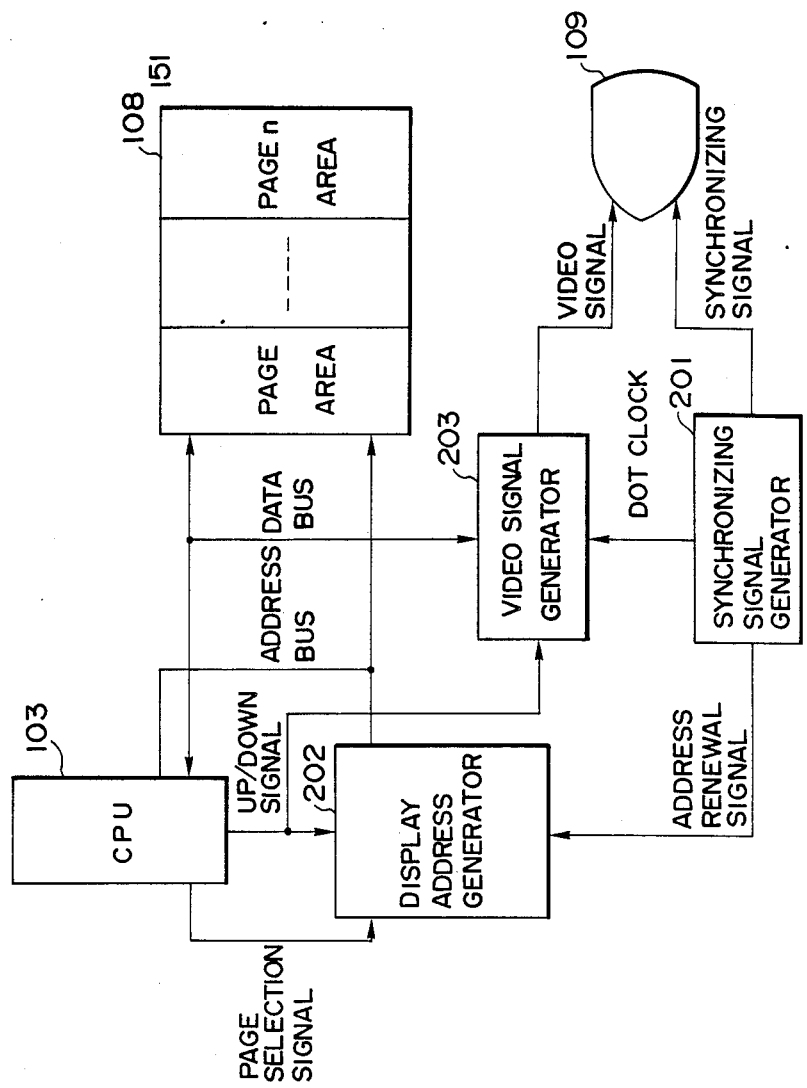
FIG. 15 is a block diagram showing another V-RAM and a peripheral circuit of a display output section.

FIG. 15 shows an arrangement corresponding to that in FIG. 10, illustrating the arrangement of an image storage and display output section. The arrangement of FIG. 15 is different from that of FIG. 10 in that an up/down signal is input from a CPU 103 to a display address generator 202 and a video signal generator 203, that a page selection signal is input to the display address generator 202, that different operations for these signals are performed, and that a V-RAM 108 comprises a dual-port RAM.

The display address generator 202 is arranged as follows due to the above signals.

Figure 16:
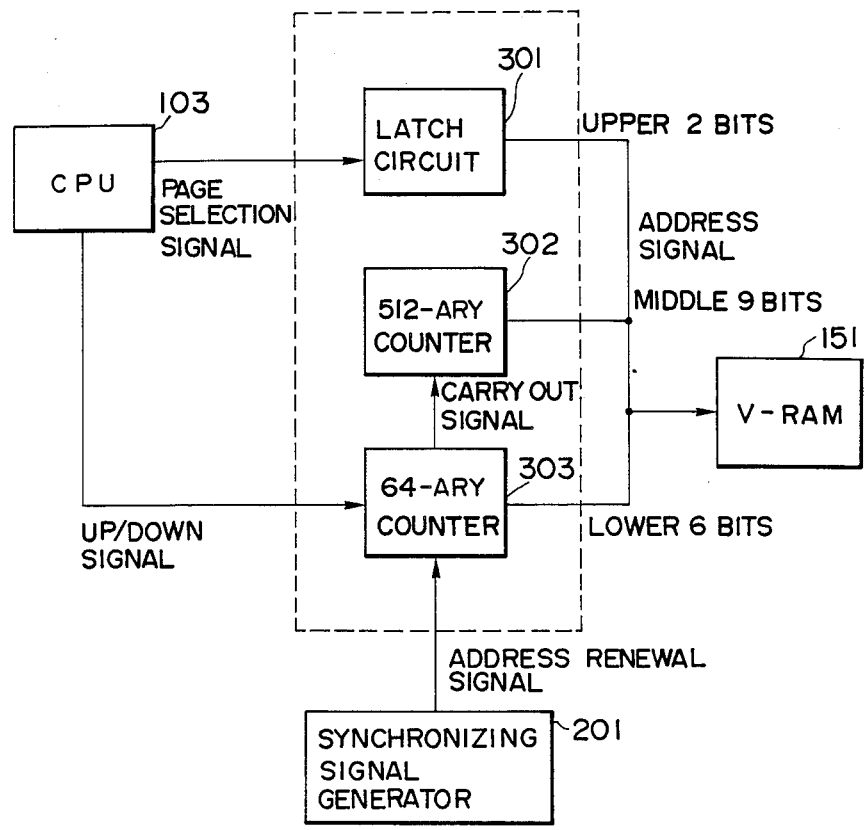
FIG. 16 is a block diagram showing an arrangement of a display address controller shown in FIG. 15.

Referring to FIG. 16, the display address generator 202 comprises a latch circuit 301, a 512-ary counter 302, and a 64-ary counter 303. The up-down signal is input to the 64-ary counter, and up/down selection signal is input to the latch circuit 301. The address renewal signal output from a synchronizing signal generator increments the 64-ary counter 303. When an overflow occurs in the counter 303, a carry out signal is input to the 512-ary counter 302.

The latch circuit 301 for designating a memory page, the 512-ary counter 302 functioning as a display line counter, and the 64-ary counter 303 generate two upper bits, nine middle bits, and six lower bits.

The operation of the arrangement described above will be described below.

When the up/down signal is set in a count-up mode, the video signal generator 203 converts the input parallel 8-bit data into serial data output from the MSB (most significant bit). If the input parallel data is $F0_H$, the order of the output data is given as "1,1,1,1,0,0,0,0". However, when the up/down signal is set in a down mode, the output order of the serial data is reversed. Parallel data $F0_H$ is output in an order of "0,0,0,0,1,1,1,1" from the LSB (least significant bit).

When the up/down signal is set in the up mode, the 64-ary counter 303 performs a count-up operation. In the down mode of the up/down signal, the counter 303 performs a count-down operation. In either case, the 512-ary counter 302 is incremented or decremented by one.

With the above arrangement, the up/down signal is inverted in order to reverse the X direction of the image. According to this method, the image can be reversed by controlling the read address. A memory area for the reversed image as in the previous embodiment can be omitted. The software load on the CPU 103 can be reduced.

Figure 17:
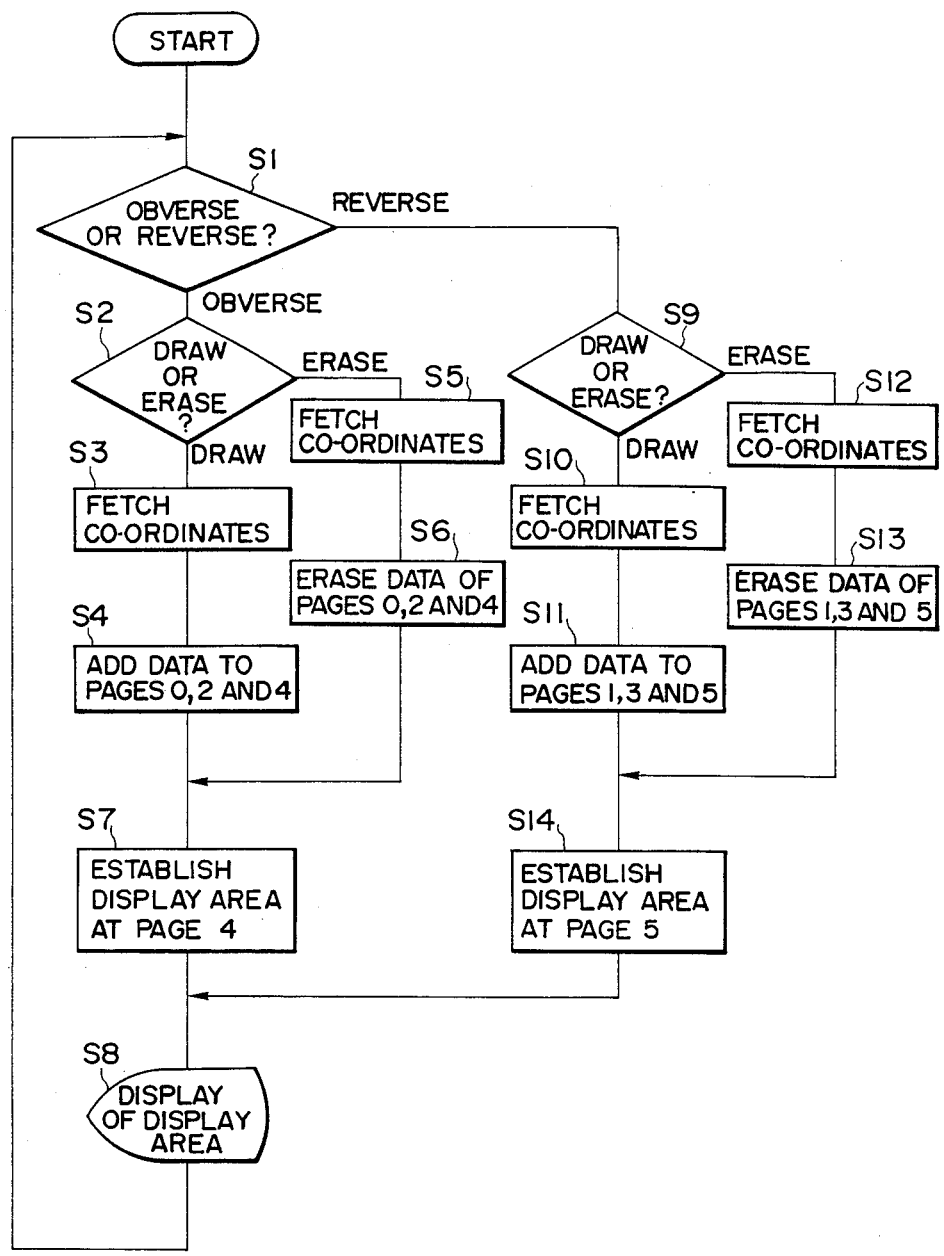
FIG. 17 is a flow chart for explaining image processing steps.

FIG. 17 is a flow chart of image processing steps performed on the basis of obverse/reverse detection of the coordinate input section. The processing steps are compiled as a control program of the CPU 103 shown in FIG. 15. The control program is stored in a storage means such as a built-in ROM in the CPU 103.

In the flow chart of FIG. 17, an output from the obverse/reverse surface detector such as the above-mentioned mercury switch is discriminated to determine whether the obverse or reverse surface of the input section of the vibration transmission plate faces up. If the obverse surface of the vibration transmission plate faces up, the flow advances to step S2. However, if the reverse surface of the vibration transmission plate faces up, the flow advances to step S9.

In step S2, the operation of the "DRAW" or "ERASE" icon shown in FIG. 11 is detected to determine whether the operator designates the "DRAW" or "ERASE" mode. If the "DRAW" mode is set, the flow advances to step S3. If the "ERASE" mode is set, the flow advances to step S5. In steps S3 and S5, coordinates are input from the vibration transmission plate 8 as described above.

In step S4, the image information input in step S3 is added to page 0, page 2, and page 4 in the V-RAM 108. As described above, obverse image information, and composite image information of reversed information of the obverse image information and the reverse image information are added to the respective pages in the V-RAM 108.

In step S6, the image information input in step S5 is erased from page 0, page 2, and page 4 in the V-RAM 108. More specifically, designated portions of the obverse image information and the composite image information are erased from the respective pages in the V-RAM 108.

In step S7, the display area of the display 109 is established at page 4 in the V-RAM 108. Thereafter, data at page 4 is input to the display 109 in step S8, and the composite data of the obverse and reverse surfaces is displayed. Therefore, the obverse and reverse image data are displayed on the display 109 in a see-through manner when observed from the obverse surface.

When it is determined in step S1 that the reverse surface of the vibration transmission plate faces up, substantially the same operations as in steps S2 to S6 are performed in steps S9 to S13. The accessed pages of the V-RAM 108 are the pages at which reverse image information is stored.

In step S9, the icon operation is detected to determine whether the "DRAW" or "ERASE" operation is performed. Coordinate information is input in steps S10 and S12. In steps S11 and S13, image information is added to or erased from page 1, page 3, and page 5 in the V-RAM 108.

The display area of the display 109 is established at page 5 in the V-RAM 108 in step S14.

Thereafter, the flow advances to step S8. In this case, the obverse and reverse image data are displayed on the display 109 in a see-through manner when observed from the reverse surface.

By the above control, the data input from the obverse and reverse surfaces of the coordinate input section are independently edited (i.e., DRAW and ERASE operations) as if they are written on the obverse and reverse surfaces of paper.

If a decision routine is inserted between steps S7 and S14 and step S8 to designate the display area, only data input from the obverse or reverse surface can be displayed.

A routine for outputting the edited image information to a recording apparatus or the like may be added. In either the display output or the recording output, the obverse image information, the reverse image information, and the composite image information thereof are independently stored in the V-RAM 108 while the obverse and reverse surfaces are reversed. By designating only the obverse image, the reverse image, or the composite image, or its color, the obverse image can be clearly discriminated from the reverse image and the discriminated images can be output.

According to this embodiment, the obverse and reverse surfaces of the image input section are detected, and the obverse and reverse data can be discriminated from each other. Therefore, preferable image processing in various applications such as drafting and design can be performed.

In the above embodiment, image information is exemplified. However, an object to be processed is not limited to the image information. The present invention is also applicable to a system for processing character information. A coordinate detection system by means of vibrations is exemplified. However, other detection systems may be used if obverse and reverse surfaces of the input section can be used as input surfaces.

According to the present invention, as is apparent from the above description, there is provided an information processing apparatus including coordinates input means for inputting coordinates from obverse and reverse input surfaces of the apparatus and means for outputting the information input from the coordinates input means, comprising means for detecting whether the coordinates are input from either the obverse or reverse input surface of the coordinates input means, and means for controlling an information input/output in accordance with a used input surface detected by the detecting means. Processing conditions can be changed in accordance with the input surface of the coordinates input apparatus during information input. For example, image erasure on a surface opposite to the input surface can be inhibited in accordance with the obverse or reverse input surface. The directions of the images can be matched and the images input from the obverse and reverse surfaces can be combined.

What is claimed is:

1. An information processing apparatus comprising:
a vibration pen for generating a vibration;
a transmission propagation member with which said vibration pen is brought into contact so as to propagate the vibration generated by said vibration pen;
sensors for detecting the vibration propagating in said vibration propagation member;
operating means for calculating a contact position of said vibration pen from detection times of the vibration detected by said sensors;
detecting means for detecting an obverse or reverse surface of said vibration propagation member; and
memory means for storing coordinate values calculated by said calculating means in different memory areas according to a detection result of said detecting means.

2. An apparatus according to claim 1, wherein said detecting means includes a mercury switch arranged in said vibration propagation member.

3. An apparatus according to claim 1, wherein said vibration propagation member comprises glass.

4. An apparatus according to claim 1, wherein said vibration pen further has a piezoelectric element.

5. An apparatus according to claim 1, further comprising a display arranged below said vibration propagation member.

6. An information processing apparatus comprising:
a coordinate input plate having a predetermined area;
detecting means, arranged on said coordinate input plate, for detecting whether an obverse or reverse surface of said coordinate input plate faces up;
means for designating a desired position of the obverse or reverse surface of said coordinate input plate which faces up; and
memory means for storing data of the position designated by said designating means at memory areas corresponding to a detection result of said detecting means.

7. An apparatus according to claim 6, wherein said designating means has vibration generating means.

8. An apparatus according to claim 7, further comprising sensors for detecting a vibration generated by said vibration generating means and supplied to said coordinate input plate.

* * * * *